United States Patent [19]
Azzara

[11] Patent Number: 5,641,452
[45] Date of Patent: Jun. 24, 1997

[54] DEVICE FOR RECOVERING SILVER FROM FLUIDS AND PROCESS USING SAME

[75] Inventor: Jerome A. Azzara, Spartanburg, S.C.

[73] Assignee: United Resource Recovery Corporation, Spartanburg, S.C.

[21] Appl. No.: 559,797

[22] Filed: Nov. 15, 1995

[51] Int. Cl.$^6$ ........................................ C22B 9/02
[52] U.S. Cl. ............................ 266/101; 266/170
[58] Field of Search ............................ 266/101, 170

[56] References Cited

U.S. PATENT DOCUMENTS

| | | |
|---|---|---|
| 3,630,505 | 12/1971 | MacKay . |
| 3,692,291 | 9/1972 | MacKay . |
| 3,840,217 | 10/1974 | MacKay . |
| 4,240,617 | 12/1980 | MacKay ........................ 266/101 |
| 4,441,697 | 4/1984 | Peterson et al. . |
| 4,523,993 | 6/1985 | Farber . |
| 4,662,613 | 5/1987 | Woog . |
| 4,740,244 | 4/1988 | Williams . |
| 4,854,552 | 8/1989 | Williams . |
| 5,004,212 | 4/1991 | Gutierrez . |
| 5,026,029 | 6/1991 | Peterson . |
| 5,112,390 | 5/1992 | MacKay . |
| 5,298,170 | 3/1994 | Woog . |
| 5,310,629 | 5/1994 | McGuckin et al. . |
| 5,472,176 | 12/1995 | Azzara ........................ 266/101 |

FOREIGN PATENT DOCUMENTS 1182646  2/1985  Canada .

OTHER PUBLICATIONS

Kodak Chemical Recovery Cartridge, Model II, Kodak Publication No. J-9 Published by Eastman Kodak Company, Dec. 1990, pp. 1–13.

*Primary Examiner*—Scott Kastler
*Attorney, Agent, or Firm*—Dority & Manning, P.A.

[57] ABSTRACT

A silver recovery device for recovering silver from silver containing fluids is provided. The silver recovery device includes an outside container having a fluid inlet and a fluid outlet. A silver recovery cartridge, positioned within the outside container, includes a silver recovery element surrounded by a liner. In one embodiment, the liner can include a sealed top for allowing the cartridge to be pressurized with fluid. Also, the silver recovery device can include a filter element for filtering the fluids prior to exiting the device.

22 Claims, 3 Drawing Sheets

DEVICE FOR RECOVERING SILVER FROM FLUIDS AND PROCESS USING SAME

BACKGROUND OF THE INVENTION

The present invention generally relates to a silver recovery device and more particularly to an apparatus which removes silver from photographic developing fluids such as fixers and developers.

Photographic films including photographic paper typically comprise a base material coated with a light-sensitive emulsion. The emulsion normally contains various silver salts, such as silver halides. During the developing process, the films are placed in various solutions that chemically react with the emulsion layer in order to develop an image. During this process, some of the silver salts and silver halides become dissolved or suspended within the developing solutions. For instance, one type of film developing solution, called a fixer, is specifically used to dissolve out any silver halides that were not exposed when the picture or image was taken.

Once these solutions become spent, it is desirable to recover the silver prior to disposing the solutions for two important reasons. First, the silver that can be recovered from photographic developing solutions is very valuable. Silver, which is considered a precious metal, has many uses and applications while being very expensive to obtain. Even recovering small amounts of silver in developing solutions can be economically advantageous.

The second reason to remove silver from photographic solutions, and perhaps more importantly, is that the silver containing solutions are considered pollutants. In fact, in many areas the silver concentration of the solution must be below five parts per million before the solution is considered safe for disposal. As such, recovering the silver from photographic developing solutions is environmentally necessary.

In the past, others have attempted to develop various devices for recovering silver from spent, photographic processing fluids. For instance, one prior art construction discloses a canister for the recovery of silver from silver-containing waste fluids. The canister includes an inner and an outer element, each removable from the other. The inner element has a vented necked top matable to a bottom container. The bottom container includes at least one foot and has a plurality of holes located on the bottom to permit fluid to rise from the bottom to the vented necked top. Fluid enters the canister, flows to the bottom, rises within the inner element and then exits out an exit mating means connected to the necked top. The inner element contains a silver recovery media such as steel wool in addition to small amounts of copper or cadmium salt. When the waste solution enters the canister, a chemical replacement reaction occurs between the silver contained in the solution and the iron contained within the steel wool.

The present inventor is also the listed inventor in U.S. Pat. No. 5,472,176 entitled "Silver Recovery Device," which is incorporated herewith in its entirety by reference thereto. In that application, a silver recovery device is disclosed in which, in one embodiment, a silver recovery element is forceably loaded into a tubular liner, causing the liner to apply a compressive force to the recovery element. The compressive force was found to prevent the formation of channels within the silver recovery element during the processing of fluids and also to cause fluid to filter more slowly through the device. The invention or inventions disclosed in the inventor's prior application made great advances in the state of the art.

The present invention is directed to further improvements in silver recovery devices. Specifically, difficulties have been encountered when processing solutions used in developing color photography. In particular, photographic solutions used to develop color films typically contain buoyant particulate matter. The particulate matter tends to float within the silver recovery device, sometimes exiting through the fluid outlet channel. Over time, the particulate matter can agglomerate within the device or in the outlet channel causing blockage of fluid flow. When blockage occurs, the fluid being processed will either be prevented from entering the silver recovery device or will overflow and bypass the silver exchange media.

In view of the above, one aspect of the present invention is to overcome problems associated with processing color film photographic fluids. In particular, the device of the present invention may include a filter element for preventing any particulate matter contained within the photographic fluid from exiting the device. Also, in another embodiment, the present invention is constructed so that pressure may be applied to the entering fluids, preventing the formation of clogs or blockages within the device or downstream. Many other advantages and features of the present invention will be apparent from the following description.

SUMMARY OF THE INVENTION

The present invention recognizes and addresses the foregoing disadvantages, and others of prior art constructions and methods.

Accordingly, it is an object of the present invention to provide an improved silver recovery device for recovering silver from various solutions.

It is another object of the present invention to provide a silver recovery device that is particularly well adapted to process photographic processing fluids for color films.

It is another object of the present invention to provide a silver recovery device that is to be constructed to allow fluid entering the device to be pressurized.

Another object of the present invention is to provide a silver recovery device that is well adapted to process fluids containing particulate matter.

Still another object of the present invention is to provide a silver recovery device that includes a sealed, outside container.

These and other objects of the present invention are achieved by providing a device for removing silver from fluids which contain silver therein. The device includes an outside container defining a fluid inlet and a fluid outlet. A silver recovery cartridge is contained within the outside container. The cartridge includes a metal above silver in the electromotive force series. The metal is surrounded by a liquid impervious liner which has a tubular shell, a sealed top and an open bottom.

The device further includes a support structure that supports the silver recovery cartridge within the outside container. The support structure is adapted to permit fluid to flow into and out of the cartridge. Further, a sealed inlet channel extends from the fluid inlet to the sealed top of the liner. In this arrangement, fluid entering the inlet channel can be pressurized without the fluid overflowing the cartridge.

In one embodiment, the device can also include a filter element positioned between the silver recovery cartridge and the outside container. The filter element can be positioned to filter fluids present within the device prior to exiting the outside container. Preferably, the filter element is made from a foam material, such as a polyethylene foam. The filter element can be in the shape of a circular ring completely encircling the silver recovery cartridge.

The metal contained within the silver recovery cartridge can be made from steel wool. In one embodiment, the metal is compacted into the liner, causing the liner to apply a compressive force to the metal.

The device of the present invention can also include other features that serve to disperse the fluid throughout the silver recovery cartridge. For instance, a fluid dispersing element in communication with the inlet channel can be incorporated into the device for dispersing fluid entering the channel in multiple directions prior to the fluid contacting the metal contained within the silver recovery cartridge. Also, at least one horizontal baffle can be contained within the silver recovery cartridge for diverting the flow of fluid through the metal.

In constructing the device, the outside container can include a lid that has been melt bonded thereto. Also, various fittings found on the device, such as where the inlet channel is connected to the outside container and to the liner, can be friction welded.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
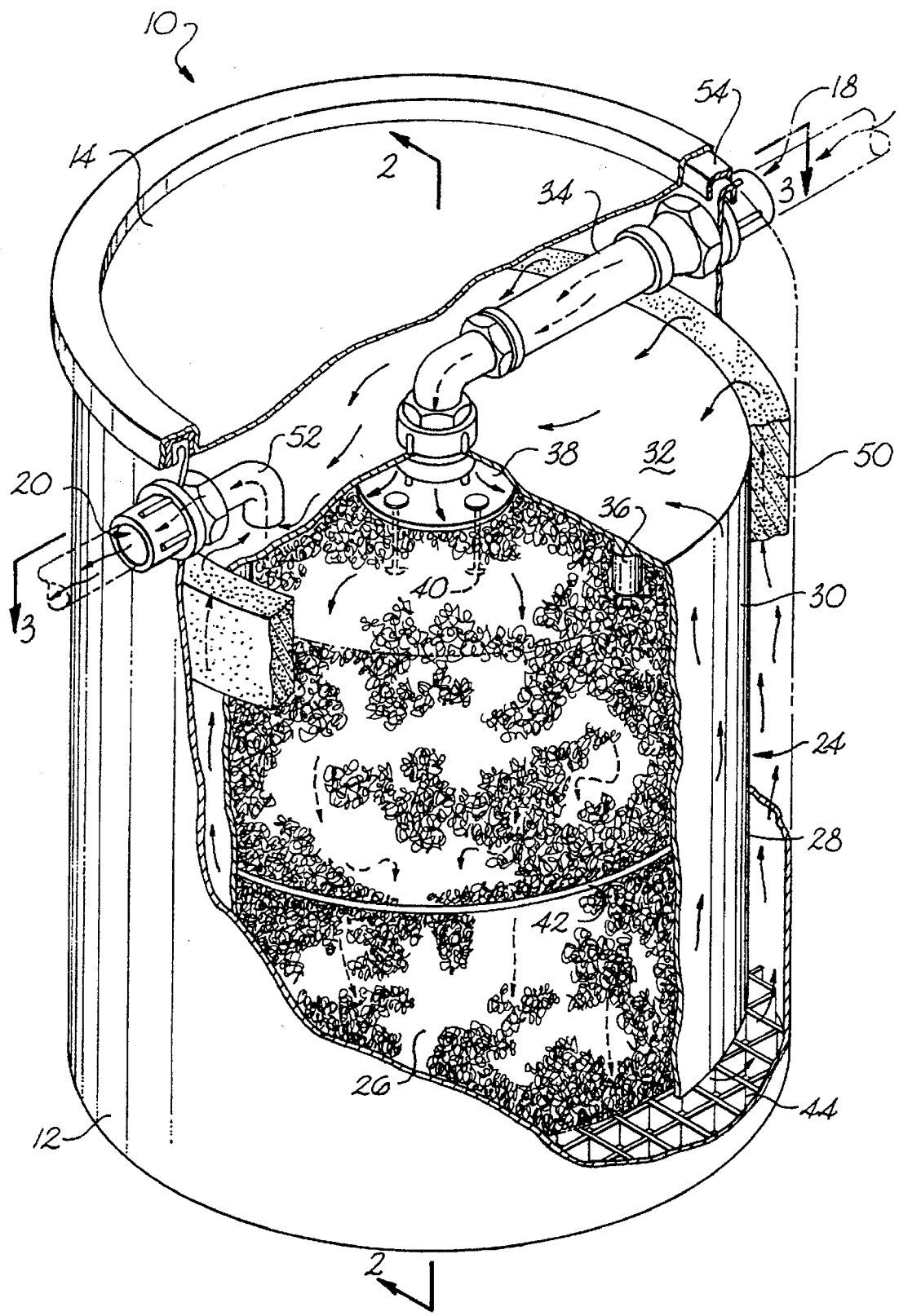
FIG. 1 is a perspective view with cutaway portions of one embodiment of a silver recovery device made in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is generally directed to silver recovery devices for recovering silver from various fluids including photographic processing fluids. In particular, the silver recovery device of the present invention is designed to process photographic fluids that have been used to develop color films. In one embodiment, the silver recovery device can be constructed such that fluid entering the device can be pressurized without permitting the fluid to bypass the silver recovery media. The silver recovery device may also include a filter element for preventing particulate matter typically present within color processing fluids from creating a blockage in the effluent.

Referring to FIG. 1, one embodiment of a silver recovery device made in accordance with the present invention is illustrated generally at 10. Silver recovery device 10 includes an outside container 12 having a sealable lid 14. Although not critical, outside container 12 can generally have a volume anywhere from about 1 gallon up to about 15 gallons. The actual size of the container will depend upon the amount of fluid and the flow rate of the fluid being processed.

Outside container 12 defines a fluid inlet 18 and a fluid outlet 20. Fluid inlet 18 and fluid outlet 20 are adapted to receive respective inlet and outlet hoses as are shown in phantom in FIG. 1. The inlet and outlet hoses provide a means for carrying fluid to and from silver recovery device 10.

Figure 2:
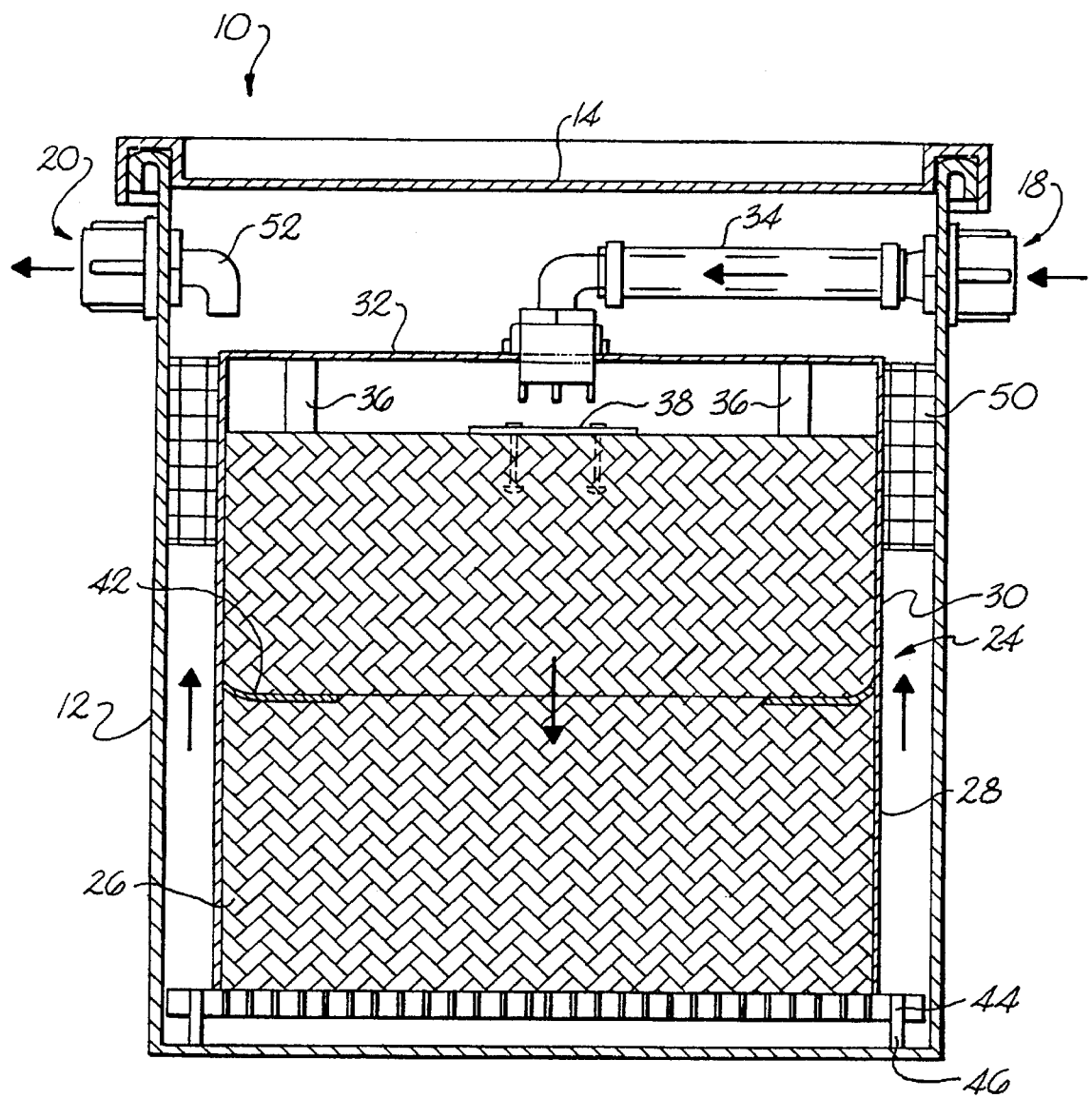
FIG. 2 is a cross-sectional view of the embodiment in FIG. 1.

As shown in FIGS. 1 and 2, contained within outside container 12 is a silver recovery cartridge generally 24. Silver recovery cartridge 24 includes a silver recovery element 26 enclosed within a liquid impervious liner 28. Silver recovery element 26 generally comprises a metal above silver in the electromotive force series capable of undergoing a chemical reaction with the entering fluid for recovering silver therefrom.

As shown, liner 28 includes a tubular shell 30 attached to a sealed top 32 which allows the cartridge to be pressurized. Opposite sealed top 32, liner 28 includes an open bottom.

As shown in FIG. 2, preferably silver recovery element 26 when placed in liner 28 is spaced a preselected distance from sealed top 32. In one embodiment, spacing members 36 can be placed within silver recovery cartridge 24 between the top of liner 28 and the top of silver recovery element 26. The space that is defined by spacing members 36 is included within the cartridge for allowing fluid entering the device to disperse throughout silver recovery element 26 as will be described in more detail hereinafter.

Extending from fluid inlet 18 to sealed top 32 of liner 28, is a sealed fluid inlet channel 34. As shown, inlet channel 34 ultimately connects and mates with sealed top 32 in a generally central location. In this arrangement, fluid enters inlet 18, flows through channel 34, and then flows through silver recovery element 26. While the fluid is filtering through element 26, liner 28 maintains the fluid within the cartridge. Most importantly, by including sealed top 32, fluid entering the device is prevented from overflowing cartridge 24. As such, fluid can be pumped into silver recovery device 10 under pressure without fear of the fluid overflowing the cartridge or bypassing the silver recovery element. In essence, by including sealed top 32, the fluid is forced to flow down through silver recovery element 26 and exit the bottom of the liner.

In this arrangement, the fluid entering the device can be pressurized to prevent clogging or blockage. Further, the pressure placed on the fluid can overcome any fluid path restrictions. Specifically, blockages are prevented from forming in silver recovery element 26, in fluid outlet 20, and anywhere downstream.

The amount of pressure that can be placed on the fluid entering the device will depend upon the particular circumstances. For instance, in some applications, the device may work successfully under gravity flow. In other applications, it will be desirous to place pressure on the incoming fluid line. Preferably, the pressure placed upon the incoming fluid line will be adjusted to give the fluid being processed a proper resonance time. In particular, the fluid being processed should be in contact with the silver recovery element for a period of time sufficient for most of the silver contained within the fluid to be deposited on the silver recovery element.

Thus far, it has been found that photographic processing fluids should remain within a silver recovery device made in accordance with the present invention from between about 4 hours to about 11 hours. More preferably, the fluid should remain within the device from about 5 hours to about 8 hours. By adjusting the pressure on the fluid entering the device, the flow rate of the fluid can be adjusted to coincide with a preselected resonance time.

When using a 3.5 gallon (the volume of the outside container) silver recovery device, it has been found that the flow rate of the fluid entering the device should be between about 25 ml to about 35 ml per minute. When using a 5 gallon silver recovery device, on the other hand, a preferred flow rate is between about 40 ml to about 50 ml per minute.

Once fluid entering silver recovery device 10 leaves inlet channel 34, the fluid, in a preferred embodiment, contacts a drip plate 38. As shown in FIGS. 1 and 2, drip plate 38 can be attached to silver recovery element 26 via attachment hooks 40 or by any other suitable means. Drip plate 38 is preferably circular and has a circumference that is less than the circumference or perimeter of silver recovery element 26. In this arrangement, fluid enters fluid inlet 18, flows through inlet channel 34, and falls upon drip plate 38. The fluid then disperses in multiple directions before entering silver recovery element 26.

Dispersing the fluid before it enters silver recovery element 26 prevents channeling and enhances reaction time within the silver recovery cartridge. The drip plate arrangement as shown in the figures, however, provides only one means for dispersing the fluid as it enters the silver recovery device. Any similar means for dispersing fluid as it enters the outside container and falls upon silver recovery element 26 is within the scope of the present invention.

For instance, in another embodiment, inlet channel 34 could have multiple outlets for dispersing the fluid in various directions before the fluid falls upon the silver recovery element. In this embodiment, a drip plate would not be necessary.

As described above, silver recovery cartridge 24 generally comprises a liner 28 having an enclosed top surrounding a silver recovery element 26. Silver recovery element 26 is preferably made from a metal above silver in the electromotive force series. As such, as a fluid containing silver salts is filtered therethrough, the silver contained within the fluid undergoes a replacement reaction with the metal contained within the silver recovery element. The resultant chemical replacement reaction causes silver to be deposited within recovery element 26 as the metal is dissolved. When the metal is exhausted, the silver recovery element can be removed and processed according to known methods for the recovery of pure silver therefrom.

Preferably, silver recovery element 26 is made from a coil of steel wool fibers. In particular, No. 4 grade steel wool has been found to be the most effective material for use in the present invention. The fiber diameters for No. 4 grade wire range between about 0.02 inches and about 0.045 inches.

In a preferred embodiment, silver recovery element 26 is compressed and pressed into liner 28. Press fitting silver recovery element 26 into liner 28 provides a number of advantages. First, the compressive force applied to the recovery element increases its density. The increase in density prevents channeling, provides more material per unit volume for reaction with the incoming fluid, and also causes the fluid to filter more slowly through the recovery element. During press fitting, the density of the silver recovery element is increased more at the circumference or perimeter. Consequently, the incoming fluid is preferably dispersed toward the outer edges of silver recovery element 26. As described above, drip plate 38 is one way of accomplishing this goal.

Press fitting silver recovery element 26 into liner 28 also creates a tight fit between the recovery element and the wall of the liner. Press fitting thus prevents the incoming fluid from forming channels at the wall of liner 28 and bypassing silver recovery element 26.

In the silver recovery device of the present invention, liner 28 is preferably made from an elastic material. During press fitting, the material used to make silver recovery element 26, such as steel wool, can be forced into the liner causing the liner to expand. Due to the elastic properties of the liner, the liner applies a compressive force upon the silver recovery element. During use, as the recovery element is degenerated, the liner retracts maintaining a compressive force upon the silver recovery element. Suitable materials for use as liner 28 include many polymeric materials, such as polyolefins.

In one exemplary embodiment, a coil of No. 4 grade steel wool is obtained. Before press fitting, the density of the coil can be between about 0.0118 lbs. per cubic inch and about 0.0200 lbs. per cubic inch. For press fitting, the coil of steel wool can be loaded into the liner through the use of a pneumatic cylinder or a hydraulic cylinder fitted with a mandrel or any other similar device. The cylinder then forces the coil of steel wool through a funnel and into liner 28. A suitable elastic liner for use in the present invention is a rotomolded liner made from low density polyethylene. Being rotomolded, the liner does not contain a seam which may rupture during press fitting.

The coil of steel wool is then forced into the polyethylene liner by the pneumatic or hydraulic cylinder. Preferably, an amount of steel wool should be forced into the liner causing expansion of the polyethylene tube without causing a rupture. In the past, the polyethylene liner has been subjected to at least about 10 to 20 lbs. per square inch of pressure on its interior. Of course, this range may vary depending upon the material selected for liner 28 and its thickness. Preferably, the liner is stretched to its maximum limits.

Alternatively, silver recovery cartridge 24 can also include a system of horizontal baffles contained therein for deflecting and dispersing fluid as it filters down through silver recovery element 26. For instance, as shown in FIGS. 1 and 2, silver recovery cartridge 24 can include a baffle 42. Baffle 42 includes a circular plate having a centrally located cutout portion. The plate is generally coaxial with silver recovery element 26.

Baffle 42, in one embodiment, is preferably made from a thin, flexible, contoured material. Preferably, the outer circumference of the baffle is equal to or slightly greater than the outer circumference of silver recovery element 26. When placed within silver recovery cartridge 24, baffle 42 can bend and extend up the walls of liner 28. As shown, as fluid filters down through silver recovery element 26, baffle 42 deflects the fluid and diverts its path toward the middle of the silver recovery element. Baffle 42 increases the retention time of the fluid within silver recovery element 26 and prevents channeling. In particular, baffle 42 prevents channels from forming at the walls of liner 28.

Baffle 42 can be installed at any predetermined height within silver recovery element 26. Preferably, baffle 42 is positioned approximately at mid-height of the silver recovery element. When installing baffle 42 into silver recovery cartridge 24, one-half of silver recovery element 26 can be press fit into liner 28. Baffle 42 can then be placed on top of the press fit elements. The second half of silver recovery elements 26 can then be press fit into liner 28 on top of baffle 42 for completing the cartridge. In another embodiment, baffle 42 can be installed within silver recovery element 26 prior to being press fit into liner 28.

As shown in the figures, only one baffle 42 is included within silver recovery device 10. However, depending upon the size of the silver recovery element and the flow rate of the fluid, more baffles can also be installed within the silver recovery element. As is apparent from the figures, if another baffle were added, preferably the baffle would be similar in shape and size to drip plate 38 for deflecting the flow of fluid to the outside of silver recovery element 26. In other words, in a preferred embodiment, the baffle arrangement used in the present invention would divert the flow of fluid in a "zig-zag" manner through silver recovery element 26.

As shown in the figures, silver recovery cartridge 24 is supported upon a support structure 44 within outside container 12. In the embodiment shown in the figures, support structure 44 includes a grid made from a polymeric material having at least one support member 46. Support structure 44 elevates silver recovery cartridge 24 off the bottom of outside container 12. Specifically, support structure 44 permits fluid to flow down through silver recovery cartridge 24 and into the space between liner 28 and outside container 12.

In a preferred embodiment, support structure 44 supports silver recovery cartridge 24 about one-half inch off the bottom of outside container 12. This height is adequate for allowing fluid to flow therethrough while also allowing room for sediment and other matter to deposit on the bottom of the container without clogging or restricting the flow.

Once the fluid filters down through silver recovery cartridge 24, the fluid exits outside container 12 through fluid outlet 20. Fluid outlet 20 is preferably located towards the top of the outside container for further ensuring a maximum retention time for the fluids being processed.

As discussed above, some silver containing fluids, especially photographic processing fluids for color films, may contain buoyant and lofty particulate matter. In order to prevent any particulate matter from exiting silver recovery device 10 and from creating a blockage in the effluent, device 10 as shown in FIGS. 1 and 2 includes a filter element 50. As shown, in one embodiment, filter element 50 can be made from a retriculated foam media. The foam can be in the shape of a circular ring positioned between liner 28 and outside container 12. One particular foam material well suited for use in the present invention is polyethylene foam which is commonly used in upholstery.

Of course, any filter media located between silver recovery cartridge 24 and fluid outlet 20 may be used in the present invention. Other examples of suitable media include spun polyester or other foam materials. The media must be capable of filtering out particulate matter without substantially inhibiting the flow of fluid therethrough. Once captured, the particulate matter will either remain within filter element 50 or gradually descend to the bottom of the container.

As shown by the arrows in FIGS. 1 and 2, silver recovery device 10 is constructed so that the flow of fluid through the device is in a "reverse" flow arrangement, which is in contrast to many prior art constructions. Diagraming the flow of fluid through silver recovery device 10 of the present invention, the fluid first enters fluid inlet 18 and flows through fluid channel 34. The fluid falls upon drip plate 38 and disperses into silver recovery element 26. While filtering through silver recovery element 26, liner 28 maintains the fluid within the recovery element while baffle 42 further disperses the fluid as it flows therethrough. Once filtered through silver recovery element 26, the processed fluid then flows through support structure 44 and into the space located between liner 28 and outside container 12. From this space, the fluid flows into an outlet tube 52 and exits through fluid outlet 20.

Many prior art constructions disclose a forward flow arrangement in which the fluid flows from the bottom to the top of a silver recovery media. In these devices, however, the most concentrated fluid contacts the bottom of the silver recovery media where most of the silver replacement occurs. Instead of being deposited within the silver recovery media, the precipitated silver falls to the bottom of the container which can clog and block the flow of fluid. In the silver recovery device of the present invention, on the other hand, most of the replacement reaction occurs toward the top of silver recovery element 26. Consequently, the precipitated silver becomes trapped within the silver recovery cartridge producing much less sediment on the bottom of the container.

However, although it is preferred for fluid entering device 10 to enter through fluid inlet 18, fluid can also be introduced through fluid outlet 20 if desired.

The materials used to construct the silver recovery device of the present invention, excluding the silver recovery element, can be made from any material that does not react with the fluids being processed or that inhibit the efficiency of the device. Preferably, plastic materials, such as polyolefins and, in particular, polyethylene, polypropylene and polystyrene may be used.

When using plastic materials to construct silver recovery device 10, preferably all the fittings connected to outside container 12 or liner 28 are friction welded or spin welded. Friction welding refers to a welding process for plastic materials in which two members are joined by rubbing the mating faces together under pressure. The plastic structures spun together each melt and bond.

Referring to FIG. 1, preferably inlet channel 34 is friction welded to outside container 12 at fluid inlet 18, outlet tube 52 is friction welded to outside container 12 at fluid outlet 20, and inlet channel 34 is friction welded to the top of liner 28. By friction welding the fittings instead of using a conventional gasket, a stronger connection is created that is less likely to develop a leak. Furthermore, friction welding is typically more economical than using gaskets.

As also shown in FIG. 1, lid 14 can be sealed and bonded to outside container 12. As shown, between lid 14 and outside container 12, a metal strip 54 has been inserted. Metal strip 54 can be heated which melts and bonds lid 14 to outside container 12. In order to heat metal strip 54, the strip can be placed in an electromagnetic field for fusing the lid to the container.

In some applications, it is very advantageous to permanently seal lid 14 to outside container 12. For instance, after use, silver recovery device 10 will contain copious amounts of silver. Silver, considered a hazardous waste, is subject to governmental regulation when transported in commerce. In the past, in order to meet Department of Transportation (DOT) approval, the spent silver recovery devices had to be placed in a sealed container for transportation. By sealing lid 14 to outside container 12, it is possible to transport the spent device without first having to place it in a further outside container.

When using metal strip 54 to fuse the lid to the container, it has been found that the bond formed between the lid and the bucket will withstand a hydrostatic force of at least 15 lbs. per square inch. Consequently, silver recovery device 10 has been given DOT approval for transportation in interstate commerce.

Figure 3:
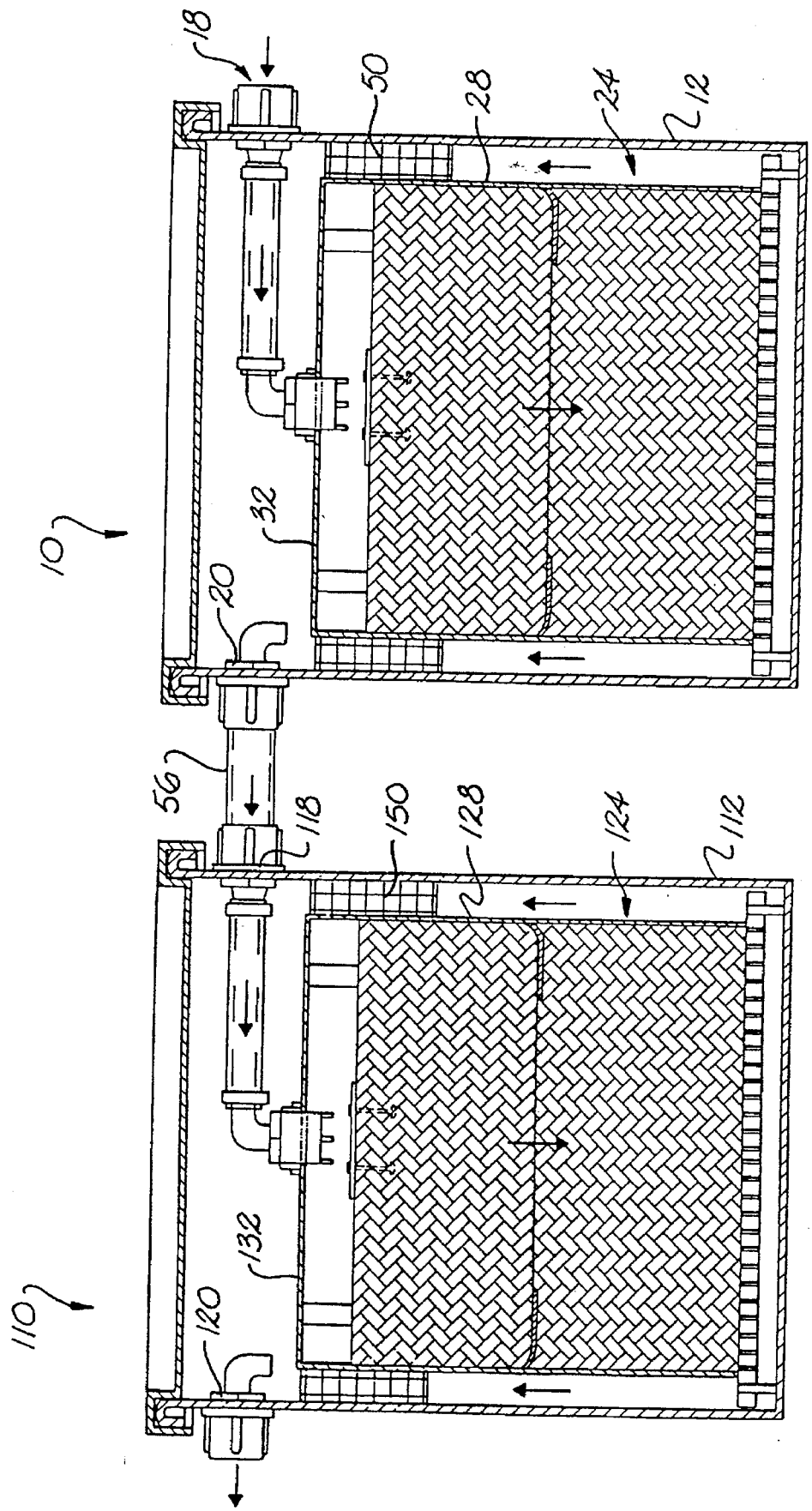
FIG. 3 is a cross-sectional view of a pair of silver recovery devices as illustrated in FIG. 1 connected in series.

In one embodiment, when using silver recovery device 10 of the present invention, it is preferable to place two or more devices in series for optimal recovery of silver. Referring to FIG. 3, a pair of silver recovery devices 10 and 110 respectively are shown. In this arrangement, fluid enters inlet 18, filters through silver recovery cartridge 24 and then exits fluid outlet 20. From fluid outlet 20, the fluid enters a connecting tube 56 entering silver recovery device 110 through fluid inlet 118. As before, the fluid then filters through silver recovery cartridge 124 and exits through fluid outlet 120.

When two or more silver recovery devices are placed in series as shown in FIG. 3, particulate matter in the processing fluid, as described above, can create many problems. If left uncontrolled, the particulate matter can flow into and accumulate in silver recovery device 110. Sediment can begin to accumulate within the silver recovery media and blockages can occur anywhere in the system. Thus, when used in tandem, silver recovery device 10 preferably includes filter element 50 and liner 28 includes a sealed top 32. Particulate matter contained within the processing fluid is thus prevented from reaching fluid outlet 20 and the fluid is capable of being pressurized within the system. Pressurization of the fluid is especially important when two or more silver recovery devices are placed in series as shown.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A device for removing silver from fluids which contain silver therein, said device comprising:

an outside container defining a fluid inlet and a fluid outlet;

a silver recovery cartridge contained within said outside container, said silver recovery cartridge comprising a metal above silver in the electromotive force series surrounded by a liquid impervious liner, said liner including a tubular shell having a sealed top and an open bottom; and a sealed inlet channel extending from said fluid inlet and mated with said sealed top of said liner, wherein said inlet channel in combination with said liner permits the pressurization of fluid entering said cartridge.

2. A device as defined in claim 1, wherein said metal within said silver recovery cartridge is compacted within said liquid impervious liner such that said tubular shell of said liner applies a compressive force to said metal.

3. A device as defined in claim 1, wherein said metal contained within said silver recovery cartridge comprises steel wool.

4. A device as defined in claim 1, further comprising a fluid dispersing element in communication with said inlet channel, said fluid dispersing element dispersing fluid entering said channel in multiple directions prior to said fluid contacting said metal contained with said silver recovery cartridge.

5. A device as defined in claim 1, further comprising at least one horizontal baffle contained within said silver recovery cartridge for diverting the flow of fluid through said metal.

6. A device as defined in claim 1, further comprising a lid melt bonded and sealed to said outside container.

7. A device as defined in claim 1, further comprising a filter element positioned between said silver recovery cartridge and said outside container, said filter element filtering fluids present within said device prior to exiting said outside container.

8. A device as defined in claim 7, wherein said filter element comprises a foam material.

9. A device as defined in claim 8, wherein said foam material comprises a polyethylene foam.

10. A device as defined in claim 8, wherein said filter element is in the shape of a circular ring.

11. A device as defined in claim 1, wherein said inlet channel is friction welded to the top of said liner at one end and to said outside container at an opposite end.

12. A device for removing silver from fluids which contain silver therein, said device comprising:

an outside container defining a fluid inlet and a fluid outlet;

a silver recovery cartridge contained within said outside container, said cartridge being received within said outside container such that a space is defined therebetween, said silver recovery cartridge comprising a metal above silver in the electromotive force series surrounded by a tubular liner;

a support structure for supporting said silver recovery cartridge within said outside container, said support structure adapted to permit fluid to flow into and out of said cartridge; and a filter element positioned in said space between said outside container and said silver recovery cartridge for filtering fluids prior to exiting said outside container.

13. A device as defined in claim 12, wherein said liner comprises a tubular shell having a sealed top and wherein said device further comprises a sealed inlet channel extending from said fluid inlet and being connected to said top of said liner.

14. A device as defined in claim 12, wherein said filter element comprises a foam material.

15. A device as defined in claim 14, wherein said foam material comprises a polyethylene foam.

16. A device as defined in claim 12, wherein said filter element is in the shape of a circular ring.

17. A device as defined in claim 12, wherein said metal contained within said silver recovery cartridge comprises steel wool having a fiber diameter between about 0.045 inches and about 0.020 inches.

18. A device as defined in claim 12, wherein said metal contained within said silver recovery cartridge is compacted within said tubular liner such that said liner applies a compressive force to said metal.

19. A device as defined in claim 13, wherein said inlet channel is friction welded to the top of said liner at one and to said outside container at an opposite end.

20. A device as defined in claim 12, further comprising a lid melt bonded and sealed to said outside container.

21. A device for removing silver from fluids which contains silver therein, said device comprising:

an outside container defining a fluid inlet and a fluid outlet;

a silver recovery cartridge contained within said outside container, said silver recovery cartridge comprising a metal above silver in the electromotive force series surrounded by a liner, said liner comprising a tubular shell having a sealed top and an open bottom;

a sealed inlet channel extending from said fluid inlet and mated with said sealed top of said liner; and a filter element positioned between said silver recovery cartridge and said outside container for filtering fluids prior to exiting said outside container.

22. A device as defined in claim 21, wherein said filter element is in the shape of a circular ring and is made from a foam material.

* * * * *